(12) United States Patent
Cochran et al.

(10) Patent No.: US 7,173,988 B2
(45) Date of Patent: Feb. 6, 2007

(54) ADAPTIVE PHASE AND GAIN IMBALANCE CANCELLATION

(75) Inventors: Bruce A. Cochran, Mesa, AZ (US); Mark A. Webster, Indian Harbour Beach, FL (US); Michael J. Seals, Melbourne, FL (US)

(73) Assignee: Conexant, Inc., Red Bank, NJ (US)

( * ) Notice: Subject to any disclaimer, the term of this patent is extended or adjusted under 35 U.S.C. 154(b) by 784 days.

(21) Appl. No.: 10/338,362

(22) Filed: Jan. 8, 2003

(65) Prior Publication Data

US 2004/0042570 A1    Mar. 4, 2004

Related U.S. Application Data

(60) Provisional application No. 60/407,135, filed on Aug. 29, 2002.

(51) Int. Cl.
*H03D 1/04* (2006.01)
*H04K 1/10* (2006.01)
*H04B 1/10* (2006.01)
*H03H 7/30* (2006.01)

(52) U.S. Cl. ............... 375/346; 375/260; 375/349; 375/235

(58) Field of Classification Search ........ 375/260–371, 375/235
See application file for complete search history.

(56) References Cited

U.S. PATENT DOCUMENTS

| | | | |
|---|---|---|---|
| 4,412,341 A * | 10/1983 | Gersho et al. | 375/349 |
| 5,396,656 A | 3/1995 | Jasper et al. | |
| 5,541,867 A | 7/1996 | Corry et al. | |
| 6,289,048 B1 * | 9/2001 | Richards et al. | 375/235 |
| 2003/0063680 A1 * | 4/2003 | Nedic et al. | 375/260 |

OTHER PUBLICATIONS

Cavers et al., "Adaptive Compensation for Imbalance and Offset Losses in Direct conversion Transceivers," IEEE Transactions on Vehicular Technology, vol. 42, No. 4, Nov. 1993, pp. 581-588, ISSN: 0018-9545/93.

Cavers, James K., "New Methods for Adaptation of Quadrature Modulators and Demodulators in Amplifier Linearization Circuits," IEEE Transactions on Vehicular Technology, vol. 46, No. 3, Aug. 1997, pp. 707-716, ISSN: 0018-9545/97.

Buchholz, et al., "Effects of Tuner IQ Imbalance on Multicarrier-Modulation Systems," Paper presented at Third IEEE International Caracas Conference on Devices, Circuits and Systems on Friday Mar. 17, 2000.

(Continued)

*Primary Examiner*—Khai Tran
*Assistant Examiner*—Cicely Ware
(74) *Attorney, Agent, or Firm*—Thomas, Kayden, Horstemeyer & Risley

(57) ABSTRACT

A method of canceling gain and phase imbalance including estimating a cancellation parameter based on the signal divided by its complex conjugate, calculating a correction value for the signal using the cancellation parameter, and correcting the signal by subtracting the correction value from the signal. Estimate the cancellation parameter may include performing a stochastic gradient algorithm or a least squares estimate. A cancellation system including a conjugate conversion unit, an estimator, a combiner, a converter, and a subtractor. The estimator estimates a cancellation parameter and the combiner combines the cancellation parameter and the complex conjugate signal to provide a cancellation signal. The converter converts the cancellation signal to a correction signal, and the subtractor subtracts the correction signal from the imbalanced signal to provide a corrected signal. The combiner may be an adaptable tap of a digital signal processing circuit.

15 Claims, 3 Drawing Sheets

OTHER PUBLICATIONS

Valkma, M. et al., "Advanced Methods for I/Q Imbalance Compensation in Communication Receivers," IEEE Trans. On Sig. Processing, vol. 49, pp. 2335-2344, Oct. 2001.

Yu, L. et al., "A Novel Adaptive Mismatch Cancellation System For Quadrature IF Radio Receivers," IEEE Trans on Circuits and Systems, vol. 46, pp. 789-801, Jun. 1999.

* cited by examiner

ADAPTIVE PHASE AND GAIN IMBALANCE CANCELLATION

CROSS-REFERENCE TO RELATED APPLICATION(S)

The present application is based on U.S. Provisional Patent Application entitled "Adaptive Gain And Phase Imbalance Cancellation", Ser. No. 60/407,135, filed Aug. 29, 2002, which is hereby incorporated by reference in its entirety.

FIELD OF THE INVENTION

The present invention relates to compensation for distortions caused by portions of communications transmitters and/or receivers, and more specifically, to canceling gain and phase imbalances generated by processing functions that otherwise degrade the performance of digital communications.

DESCRIPTION OF RELATED ART

Many modem communications systems employ in-phase (I) and quadrature phase (Q) components combined in the transmitted signal. Gain and phase imbalance occurs while performing signal processing functions associated with analog and digital portions of communications transmitters and receivers, particularly the analog processing functions. Gain and phase imbalances degrade the performance of digital communications, e.g., systems employing digital signal processing (DSP) techniques. For example, gain and phase imbalances between I and Q signals cause difficulty in determining data when compared with data points of applicable constellation maps. Large gain or phase imbalances can effectively disable reliable communications, particularly higher density modulation techniques used to achieve higher data transmission rates. For example, severe gain imbalance (e.g., 3 dB or more) and severe phase imbalance (e.g., 18 degrees or more) in a system employing orthogonal frequency division multiplexing (OFDM) at 54 megabits per second (Mbps) can cause a packet error rate (PER) of 50% or more, so that reliable communication is difficult if not impossible to achieve.

A receiver typically includes one or more stages of amplifiers, filters, splitters, oscillators, mixers, signal traces/lines etc., that individually and collectively contribute to gain and phase distortions. One or more mixer stages are used to down convert a received signal to more manageable frequency levels. Each mixer stage adds phase shift which contributes to phase distortion. A power splitter or signal divider or the like is provided within the receiver to retrieve the in-phase and quadrature phase signals, which are intended to be exactly 90 degrees apart. The splitter is not perfect, however, so that the I and Q signals are not apart in phase by exactly 90 degrees. Additional processing of the respective I & Q signals, including amplification, mixing, conversions, demodulation, etc., further contribute to gain and phase distortions. Further, the signal lines of the I and Q channels, operating in a similar fashion to transmission lines, are not exactly equal in length causing a disparity in attenuation and phase shift, causing additional gain and/or phase imbalance.

Similar sources of gain and/or phase imbalance occur in transmitters as is known to those skilled in the art. The sources of imbalance distortion is similar, except that the transmitter performs similar but reverse functions, such as up conversion, combining, modulation, etc. In this manner, gain and phase imbalance exists in the transmitted signal, and thus in the signal received by the receiver prior to receiver processing. Receiver processing further degrades the signal.

Several gain and phase imbalance compensation techniques are known. Some methods use off-line signals, such as training signals or the like, which require taking the system off-line for calibration. Such off-line methods degrade overall system efficiency by increasing transmission medium (or media) overhead to perform calibration and compensation. Other methods are specific to particular modulation types and are thus limited in scope. Still other methods use complicated calculations that require relatively complex and power-hungry circuitry that is difficult to implement. It is desired to provide an automatic and relatively simple imbalance compensation solution that operates on the actual communication signals without having to go off-line.

SUMMARY OF THE INVENTION

A method of canceling gain and phase imbalance of a signal according to an embodiment of the present invention includes determining a complex conjugate of the signal, estimating a cancellation parameter which is based on the signal divided by its complex conjugate, calculating a correction value for the signal using the cancellation parameter and the complex conjugate, and correcting the signal by subtracting the correction value from the signal. The method may include performing a stochastic gradient algorithm to estimate the cancellation parameter. For example, estimating a cancellation parameter may include multiplying a cancellation parameter value by a complex conjugate sample to provide a comparison value, subtracting the comparison value from a signal sample to provide an error value, applying an adaptation function using the error value and the cancellation parameter, and updating the cancellation parameter value. The method may further include repeating the multiplying, subtracting, applying and updating in an iterative to converge sequential cancellation parameter values.

The method may further include using a default cancellation parameter value to begin a stochastic gradient determination for a first packet, storing a final cancellation parameter value determined from the first packet, and using the final cancellation parameter value as an initial cancellation parameter value to begin the stochastic gradient determination for a second packet. In an alternative embodiment, estimating a cancellation parameter comprises performing a least squares estimation.

A method of compensating a first signal for gain and phase imbalance according to another embodiment of the present invention includes receiving a first signal having gain and phase imbalance, creating a second signal that is a complex conjugate of the first signal, creating a third signal by multiplying the second signal by a cancellation parameter based on a ratio of the first and second signals, and creating a corrected signal by subtracting one half of the third signal from the first signal.

A cancellation system for compensating for gain and phase imbalance of an imbalanced signal according to another embodiment of the present invention, includes a conjugate conversion unit, an estimator, a combiner, a converter, and a subtractor. The conjugate conversion unit receives the imbalanced signal and provides a complex conjugate signal that is a complex conjugate of the imbalanced signal. The estimator estimates a cancellation parameter based on the imbalanced signal divided by its complex conjugate. The combiner combines the cancellation parameter and the complex conjugate signal to provide a cancellation signal. The converter converts the cancellation signal to a correction signal, and the subtractor subtracts the correction signal from the imbalanced signal to provide a corrected signal.

The combiner may be an adaptable tap that multiplies the complex conjugate signal by the cancellation parameter to provide the cancellation signal. In this case, the cancellation system includes a subtractor that subtracts the cancellation signal from the imbalanced signal to provide an error signal. Also, the estimator may be an update unit that applies a stochastic gradient algorithm using the cancellation parameter and the error signal to update the cancellation parameter of the adaptable tap. The converter may be a digital shift register that divides the cancellation signal by two to generate the correction signal.

BRIEF DESCRIPTION OF THE DRAWINGS

A better understanding of the present invention can be obtained when the following detailed description of embodiments of the present invention is considered in conjunction with the following drawings, in which.

DETAILED DESCRIPTION OF EMBODIMENT(S) OF THE INVENTION

Embodiments of the invention described herein automatically compensate for gain and/or phase imbalance that occurs while performing the analog and digital processing functions associated with communications transmitters and/or receivers. Embodiments of the invention described herein operate on the signal itself, without having to use offline signals such as training signals or the like. A particularly advantageous location for an imbalance cancellation system according to an embodiment of the present invention is within a receiver and operative on the received signal since the combined gain and phase imbalance caused by both the transmitter and the receiver may be compensated within one device. Nonetheless, an embodiment of the invention may be provided within a transmitter to cancel imbalance in the signal to be transmitted. A transmitter-based imbalance cancellation system enables a more balance signal to be transmitted.

Embodiments of the invention are suitable for a wide variety of waveforms (modulation techniques), including, but not limited to, OFDM, QAM, CCK, FM, CDMA (e.g. QPSK), TDMA, etc. Embodiments of the invention are easy to implement and automatically adapt to remove existing gain and phase imbalances in a signal. Embodiments of the invention herein derive gain and/or phase imbalance from the image of the signal. Embodiments of the invention use the complex conjugate of the signal as a reference signal to perform image frequency cancellation.

Figure 1:
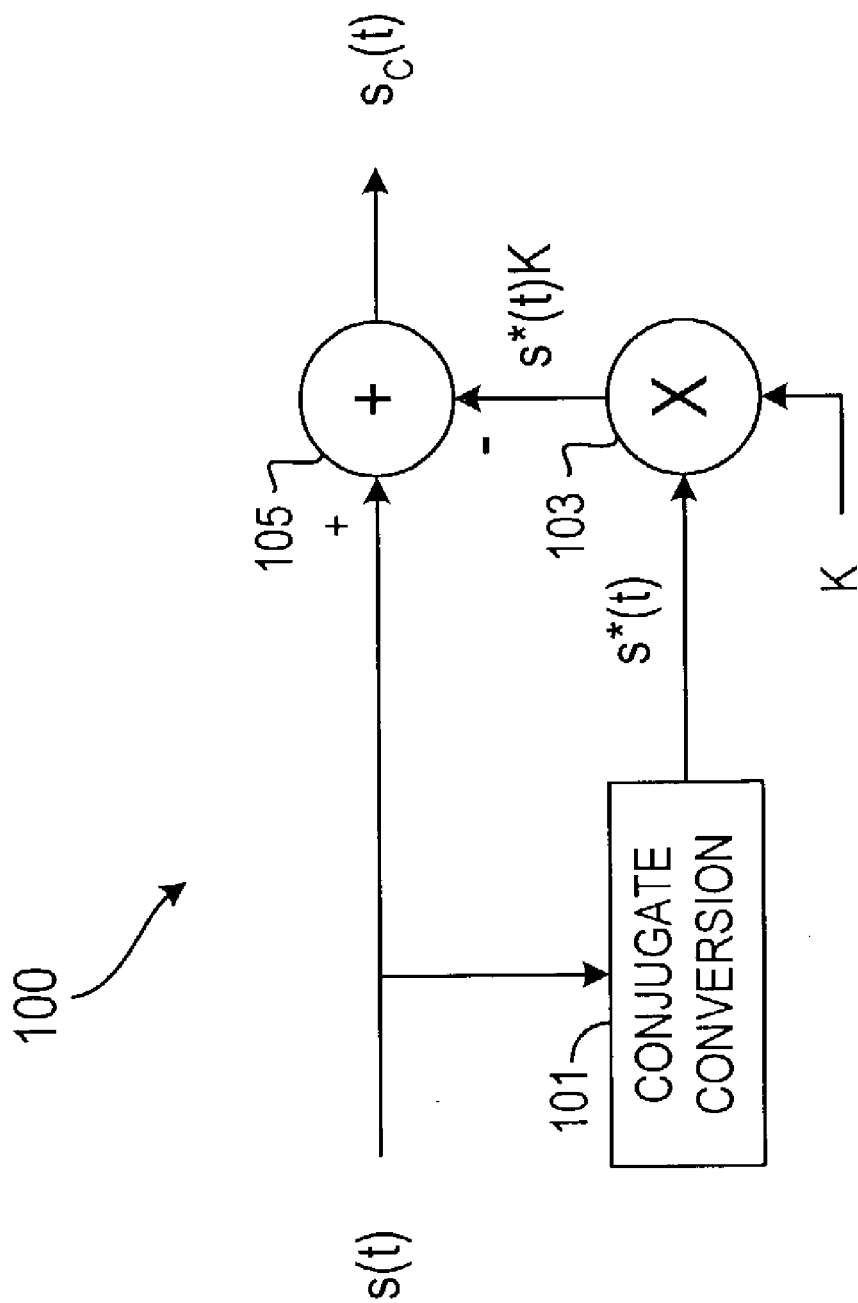
FIG. 1 is a simplified block diagram of a cancellation system employing image cancellation using a complex conjugate of a signal according to embodiments of the present invention.

FIG. 1 is a simplified block diagram of a cancellation system 100 employing image cancellation using a complex conjugate of a signal s(t) according to embodiments of the present invention. The parenthetic value "t" denotes time in which the signal "s" is indicated in continuous format. The cancellation system 100 may be employed in a receiver or a transmitter, where detection, amplification, filtering, up/down conversion, splitting/combining and modulation/demodulation portions of the underlying communication device are not shown. For example, a wireless receiver employed in a wireless local area network (WLAN) includes a radio with an antenna for receiving and converting a radio frequency (RF) to a baseband signal. The baseband signal is provided to digital processing circuitry, such as a baseband processor or the like, for further processing using DSP techniques or the like to retrieve the information incorporated therein. In the receiver case, the s(t) signal is a received signal that has been down converted, demodulated and split into I and Q portions and generally incorporates gain imbalance or phase imbalance or any combination of both as previously described. It is appreciated by those skilled in the art that a portion of the imbalance may have been generated by the transmitter that originally transmitted the signal.

The s(t) signal may be defined according to the following equation 1:

$$s(t)=s_D(t)+s_I(t) \qquad (1)$$

where, $s_D(t)$ is the desired signal, and where $s_I(t)$ is an undesired image representing gain and phase imbalance of the desired signal. The desired signal $s_D(t)$ and image signal $s_I(t)$ are related by a factor K according to the following equation 2:

$$s_I(t)=s_D{}^*(t)K \qquad (2)$$

where the asterisk symbol "*" represents the complex conjugate operation. Using the relationships of equations 1 and 2, the s(t) signal may be represented by the following equation 3:

$$s(t)=s_D(t)+s_D{}^*(t)K \qquad (3)$$

The cancellation system 100 includes a conjugate conversion block 101 which receives the s(t) signal and provides a complex conjugate version thereof, shown as s*(t). The s*(t) signal is provided to one input of a multiplier 103, which multiplies the factor K by the s*(t) signal and provides a correction signal s*(t)K. The s(t) signal is provided to the positive input of a subtractor 105, which receives the s*(t)K correction signal at its negative input. The output of the subtractor 105 provides a corrected signal $s_C(t)$, which, employing the relationships described above, is a slightly attenuated version of the desired signal $s_D(t)$ as shown by the following equation 4:

$$s_C(t)=s(t)-s^*(t)K=[1-|K|^2]s_D(t) \qquad (4)$$

The challenge illustrated by the cancellation system 100 is to determine or otherwise estimate the factor K in a feasible and practicable manner to provide the corrected signal $s_C(t)$.

A cancellation parameter W is defined as the s(t) signal divided by its complex conjugate as shown by the following equation 5:

$$W=s(t)/s^*(t) \qquad (5)$$

Using mathematical principles and known or otherwise expected properties of the signal, it can be shown that W and K are related in accordance with the following equation 6:

$$W=2K/[1+|K|^2]\approx 2K \qquad (6)$$

where W is approximately equal to ("~", or estimated as) 2K when it is assumed that K is relatively small, such as K<0.1.

Figure 2:
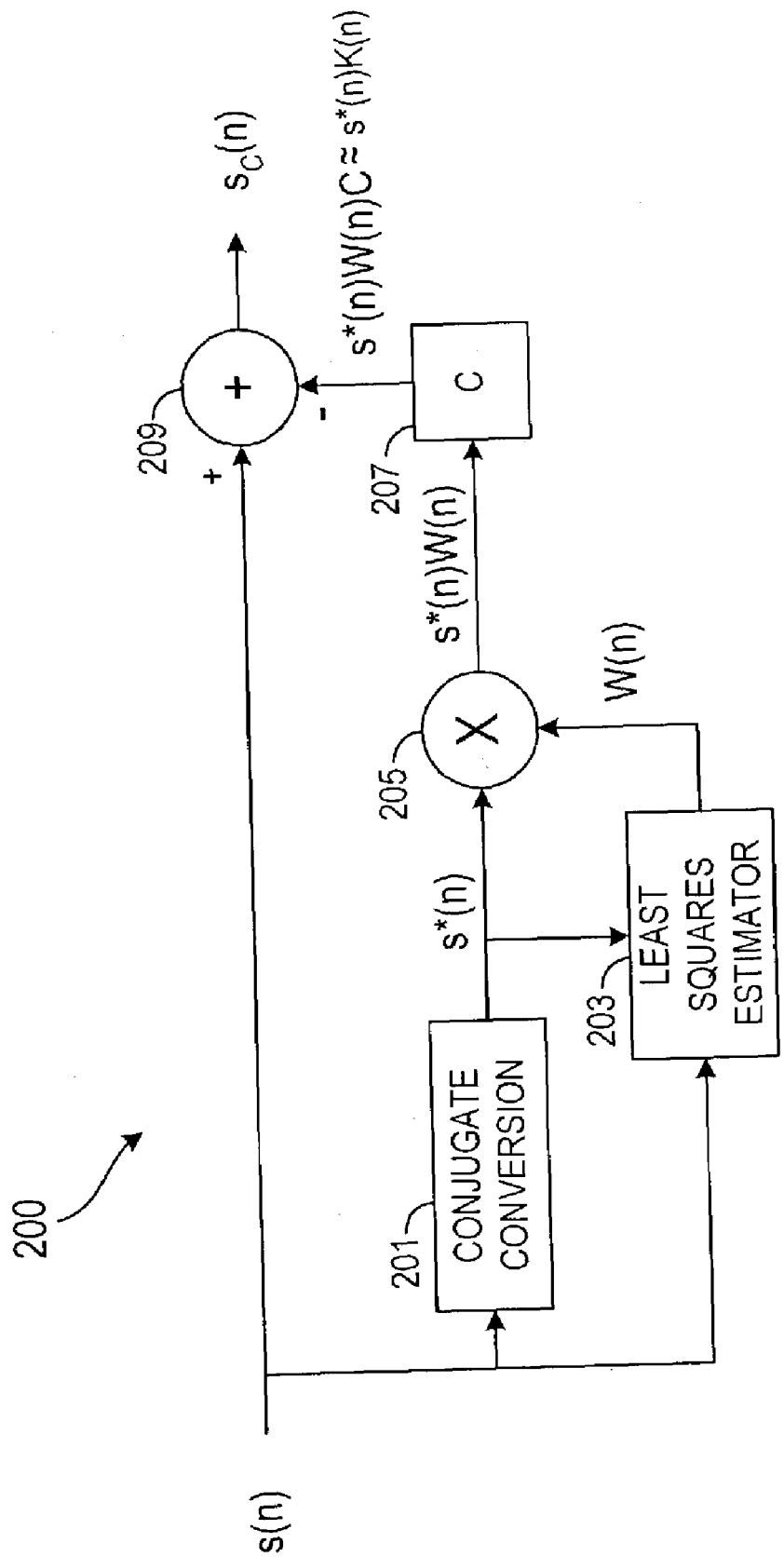
FIG. 2 is a simplified block diagram of a cancellation system employing a least squares image estimator for estimating a cancellation parameter used to compensate for gain and phase imbalance in a sampled signal.

FIG. 2 is a simplified block diagram of a cancellation system 200 employing a least squares image estimator 203 for estimating cancellation parameter values W(n) used to cancel gain and phase imbalance in a signal s(n). The signal s(n) and its conjugate s*(n) are provided in discrete format in which "n" denotes discrete samples of the corresponding signal "s(t)". A receiver, for example, performs analog processing on a received analog signal to convert to an analog baseband signal, which is converted to digital format by at least one analog to digital converter (not shown). In the cancellation system 200, discrete values of the cancellation parameter W, shown as W(n), are calculated, and corresponding discrete samples of K, shown as K(n), are derived from W(n) and used to cancel the image signal causing gain and/or phase imbalance.

The s(n) signal, having gain and/or phase imbalance, is provided to a conjugate conversion block 201, which outputs the s*(n) signal. The s(n) and s*(n) signals are both provided to the least squares estimator 203, which calculates least squares estimate values W(n) for corresponding s(n) and s*(n) samples. The s*(n) and W(n) values are provided to respective inputs of a multiplier 205, which provides corresponding s*(n)W(n) values to an input of a constant (C) block 207, which converts the s*(n)W(n) values to corresponding s*(n)K(n) correction values employing the approximate conversion between W and K. As described previously, K is approximately equal to W/2, in which block 207 is a divider that divides by C=2 or a multiplier that multiplies by C=½. In a particularly convenient embodiment, the block 207 comprises at least one shift register that right-shifts each of the digital s*(n)W(n) values once to provide the corresponding digital s*(n)K(n) correction values. The s(n) signal is provided to a positive input of a subtractor 209, and the output of the block 207 is provided to a negative input of the subtractor 209. The subtractor 209 outputs corrected signal values $s_C(n)$ in accordance with equation 4.

The cancellation system 200 illustrates one embodiment for estimating the cancellation parameter values W(n) used for calculating the s*(n)K(n) correction values, which are further used to cancel, correct or otherwise compensate for the undesired image of the s(n) signal. The W(n) cancellation parameter values are determined using the least squares approximation of s(n)/s*(n) resulting in relatively accurate values. The least squares estimator 203 may be implemented in any appropriate manner, such as appropriate circuitry, logic and/or firmware as known to those skilled in the art, for providing relatively accurate W(n) values. It is also appreciated, however, that the least squares estimator 203 generally involves relatively complex mathematical functions that may require a considerable amount of space and/or power in physical implementations on an integrated circuit.

Figure 3:
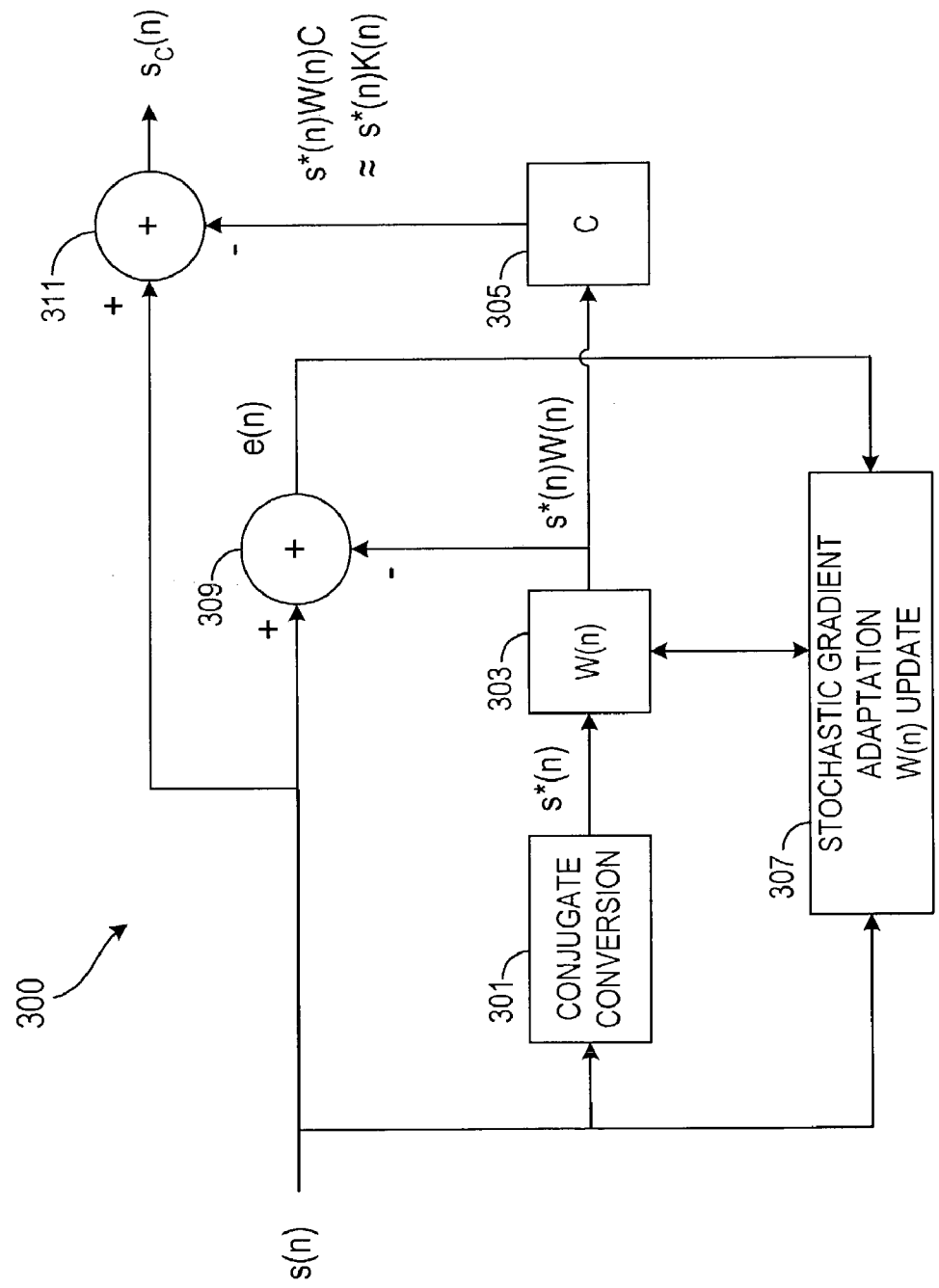
FIG. 3 is a simplified block diagram of a cancellation system employing a stochastic gradient method for estimating the cancellation parameter used to compensate for phase and gain imbalance in the sampled signal.

FIG. 3 is a simplified block diagram of a cancellation system 300 employing a stochastic gradient update method for estimating the cancellation parameter values W(n) used to compensate for phase and gain imbalance in the sampled signal s(n). Again, the s(n) signal is a complex valued signal that has suffered gain and/or phase imbalance in a transmitter or receiver. The s(n), signal is provided to positive inputs of first and second subtractors 311 and 309, to an input of a conjugate conversion block 301, and to an input of a stochastic gradient adaptation block 307. The conjugate conversion block 301, substantially identical to the conjugate conversion block 201, converts the s(n) samples to complex conjugate samples s*(n), which are provided to the input of a tap 303. The tap 303 multiplies each s*(n) sample by a current cancellation parameter value W(n). In one embodiment, the tap 303 is an adaptable tap in a digital signal processing circuit. The tap 303 outputs s*(n)W(n) values to a negative input of the subtractor 309 and to an input of a constant (C) block 305. The block 305 is substantially identical to the block 207 and converts the s*(n) W(n) values to s*(n)K(n) correction values in a similar manner as previously described, where the s*(n)K(n) correction values are provided to a negative input of the subtractor 311. In one embodiment, for example, the block 305 comprises a shift register that divides each s*(n)W(n) value by 2. The subtractor 311 subtracts each s*(n)K(n) correction value from a corresponding s(n) sample to generate the corrected signal samples $s_C(n)$.

The subtractor 309 subtracts each s*(n)W(n) comparison value from a corresponding s(n) sample and generates corresponding error signal values e(n), which are provided to another input of the stochastic gradient adaptation block 307. The stochastic gradient adaptation block 307 uses the e(n), s(n) and W(n) values to generate a new cancellation parameter value W(n+1). The new W(n+1) value is stored in the tap 303 and used to generate a new comparison value s*(n+1)W(n+1) for the next signal sample s(n+1). The new comparison value is used to generate a new correction value s*(n+1)K(n+1) used for a new corrected signal value $s_C(n+1)$. The new comparison value is also used to calculate a new error value e(n+1), which is further used to update the cancellation parameter again, and so on. Operation loops in this manner for successive samples of s(n), so that the W(n) values converge over time to relative accurate cancellation parameter values. Within the stochastic gradient adaptation block 307, the error signal e(n) is correlated against the s(n) signal to update the estimate of W(n) using the stochastic gradient adaptation algorithm. In one embodiment, the cancellation parameter values W(n) are updated according to the following equation 7:

$$W(n+1)=W(n)+\delta e(n)s(n) \qquad (6)$$

where "δ" is an adaptation function.

The speed of the tap adjustment is controlled by the adaptation function δ, which may be a single parameter or constant or an algorithm used to generate multiple adaptation values. The particular choice of adaptation function depends on many factors, such as the particular communication scheme employed, the desired convergence speed, instability factors, etc., and may be determined mathematically or experimentally. Experiments with 802.11-based packetized systems have shown that long packets at the lowest data rates determine a maximum adaptation constant that avoids instability while shorter packets at the highest data rates determine a minimum adaptation constant that achieves desired acquisition speed. These minimum and maximum values provide a range of values that may be employed for particular system designs. The system may vary the adaptation constant over time or based on other criteria in accordance with an adaptation algorithm to maximize performance, such as to reduce instability or achieve desired convergence or acquisition speed. In a very specific embodiment for 802.11-based systems, an exemplary initial adaptation value of $7 \times 10^{-9}$ was deemed a reasonable initial value, which was then reduced one or more times after certain groups of packets had been processed. For example, the initial value is used for the first ten (10) packets, then reduced by half for the next five (5) packets, and then reduced by half again for remaining packets. The tap 303 converges to more accurate cancellation parameter values, so that smaller adaptation constants enable further convergence accuracy or otherwise increase stability. It is appreciated that any suitable adaptation function or "gear shifting" scheme may be determined and employed to achieve desired performance and operation.

The initial W(n) value may be any suitable value that enables the loop to converge within a reasonable amount of time. An initial value of zero (0), for example, is contemplated for certain embodiments. For packet-based systems (e.g., 802.11), the final W(n) tap value determined for one data packet may be stored at the end of that packet, and the stored W(n) value is then used at the start of the next packet. The tap 303 includes a memory, such as at least one register or the like, for storing the latest W(n) value. In this manner, the initial value of W(n) for a subsequent packet is the last value from a previous packet, which enables the loop to converge to an accurate estimate of W(n) after several packets. Use of the last tap value from one packet to the next enables the gain and phase imbalance to be tracked since it may vary over time. After a plurality of packets have been processed, the loop converges to relatively accurate tap values and subsequent imbalance is accurately compensated.

The cancellation parameters W(n) can be used to determine the specific level of gain and/or phase imbalance present on the signal. This feature is useful to quantify the amount of gain and/or phase imbalance associated with a transmitted and/or received signal. One application of this feature could be a built in self-test that monitors transmitter and/or receiver hardware to determine if the hardware is degrading such that it should be replaced or repaired. Some features of embodiments of the invention herein include being able to correct for gain and/or phase imbalance in real time without having to go off-line. Embodiments of the invention may be implemented in the digital domain using digital signal processing methods. Embodiments of the invention may be implemented using very simple algorithms with little memory since few arithmetic operations are required, and since a separate training signal is not required.

Test results of one embodiment of the invention demonstrated improvement of the error vector magnitude (EVM) associated with an OFDM modulated signal that was distorted by gain and phase imbalance. When applied to an IEEE 802.11a OFDM signal operating at 54 Mbps having 3 dB of gain imbalance and 18 degrees of phase imbalance, near-error-free operation in the presence of additive Gaussian channel noise was achieved and variation of constellation plots was significantly reduced. The same test was performed using a system without employing any embodiments of the invention, which resulted in a packet error rate (PER) of 50%. A PER of 50% is relatively excessive and renders communication difficult if not impossible.

Although the present invention has been described in detail with reference to certain embodiments including preferred versions thereof, other versions and variations are possible and contemplated. The present invention is intended to cover such alternatives, modifications, and equivalents, as can be reasonably included within the spirit and scope of the invention. Those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A method of canceling gain and phase imbalance of a signal, comprising:
   determining a complex conjugate of the signal;
   estimating a cancellation parameter, said cancellation parameter based on the signal divided by its complex conjugate;
   calculating a correction value for the signal using said cancellation parameter and said complex conjugate; and
   correcting the signal by subtracting said correction value from the signal, wherein the signal is provided in sequential samples, and estimating a cancellation parameter comprises performing a stochastic gradient algorithm comprising:
   multiplying a cancellation parameter value by a complex conjugate sample to provide a comparison value;
   subtracting said comparison value from a signal sample to provide an error value;
   applying an adaptation function using said error value and said cancellation parameter and updating said cancellation parameter value; and
   repeating said multiplying, subtracting, applying and updating in an iterative manner to converge sequential cancellation parameter values.

2. The method of claim 1, wherein said calculating a correction value comprises dividing said comparison value by a constant value.

3. The method of claim 2, said comparison value comprising a digital value, wherein said dividing said comparison value by a constant value comprises shifting said digital value to divide by two.

4. The method of claim 1, wherein said applying an adaptation function further comprises:
   generating a cancellation parameter adjust value by multiplying an error value by an adaptation value and a signal sample; and
   adding said cancellation parameter adjust value to said cancellation parameter value.

5. The method of claim 4, the signal comprising a plurality of packets, further comprising:
   using a default cancellation parameter value to begin a stochastic gradient determination for a first packet;
   storing a final cancellation parameter value determined from said first packet; and
   using said final cancellation parameter value as an initial cancellation parameter value to begin said stochastic gradient determination for a second packet.

6. The method of claim 5, further comprising employing an adaptation algorithm to generate a plurality of decreasing adaptation values.

7. The method of claim 6, wherein said employing an adaptation function comprises:
   using a first adaptation value for a first number of packets;
   reducing said first adaptation value to a second adaptation value for a second number of packets; and
   reducing said second adaptation value to a third adaptation value for subsequent packets.

8. A method of compensating a first signal for gain and phase imbalance, comprising:
   receiving a first signal having gain and phase imbalance;
   creating a second signal that is a complex conjugate of said first signal;
   creating a third signal by multiplying said second signal by an estimated cancellation parameter, said cancellation parameter based on a ratio of said first and second signals; and
   creating a corrected signal by subtracting one half of said third signal from said first signal.

9. The method of claim 8, wherein said cancellation parameter is an adaptable tap in a digital signal processing circuit.

10. The method of claim 8, further comprising:
    updating said cancellation parameter using a stochastic gradient algorithm.

11. The method of claim 8, further comprising:
creating an error signal by subtracting said third signal from said first signal; and
updating said cancellation parameter by applying a stochastic gradient algorithm using said first signal and said error signal to create an adjust signal and adding said adjust signal to said cancellation parameter.

12. The method of claim 11, wherein said applying said stochastic gradient algorithm includes using an adaptation function for loop control.

13. A cancellation system for compensating for gain and phase of an imbalanced signal, comprising:
a conjugate conversion unit that receives the imbalanced signal and provides a complex conjugate signal being a complex conjugate of the imbalanced signal;
an estimator that estimates a cancellation parameter based on the imbalanced signal divided by its complex conjugate;
a combiner that combines said cancellation parameter and said complex conjugate signal to provide a cancellation signal;
a converter that converts said cancellation signal to a correction signal; and
a subtractor that subtracts said correction signal from the imbalanced signal to provide a corrected signal, wherein said converter comprises a digital shift register that divides said cancellation signal by two to generate said correction signal.

14. The cancellation system of claim 13, further comprising:
said combiner comprising an adaptable tap that multiples said complex conjugate signal by said cancellation parameter to provide said cancellation signal;
a subtractor that subtracts said cancellation signal from the imbalanced signal to provide an error signal; and
wherein said estimator comprises an update unit, coupled to said adaptable tap, that applies a stochastic gradient algorithm using said cancellation parameter and said error signal to update said cancellation parameter of said adaptable tap.

15. The cancellation system of claim 14, wherein said update unit employs an adaptation function.

* * * * *